United States Patent [19]

Linstromberg

[11] 4,130,746

[45] Dec. 19, 1978

[54] SNAP-ACTION CAM FOR TIMER SWITCH

[75] Inventor: William J. Linstromberg, Evansville, Ind.

[73] Assignee: Whirlpool Corporation, Benton Harbor, Mich.

[21] Appl. No.: 786,564

[22] Filed: Apr. 11, 1977

[51] Int. Cl.$^2$ .................... H01H 43/10; G05D 23/32; F16H 53/00; H01H 3/32

[52] U.S. Cl. .................................... 200/38 R; 62/157; 74/567; 200/38 D; 200/153 LB

[58] Field of Search ......................... 62/233, 157, 276; 74/567, 568 R, 568 T; 200/38 A, 38 F, 38 D, 38 R, 153 LB

[56] References Cited

U.S. PATENT DOCUMENTS

| | | | |
|---|---|---|---|
| 3,057,973 | 10/1962 | Goodhouse | 200/153 LB X |
| 3,107,281 | 10/1963 | Tufts | 200/38 D |
| 3,814,874 | 6/1974 | Brown | 200/153 LB X |

*Primary Examiner*—James R. Scott
*Attorney, Agent, or Firm*—Wegner, Stellman, McCord, Wiles & Wood

[57] ABSTRACT

A snap-action camming means for use in controlling a double throw electrical switch. The switch may be biased to a first condition and substantially instantaneously thrown to a second operating condition by a spring associated with the cam. A single cam and cam follower are utilized to provide substantially positive throwing of the switch in both directions so as to avoid a dead break condition wherein the switch is maintained in an intermediate position between the two operating conditions. In one embodiment, the spring is formed integrally with the cam. The spring may be arranged to position the cam follower suitably to be maintained by subsequent engagement thereby with a portion of the cam.

17 Claims, 7 Drawing Figures

FIG. 6
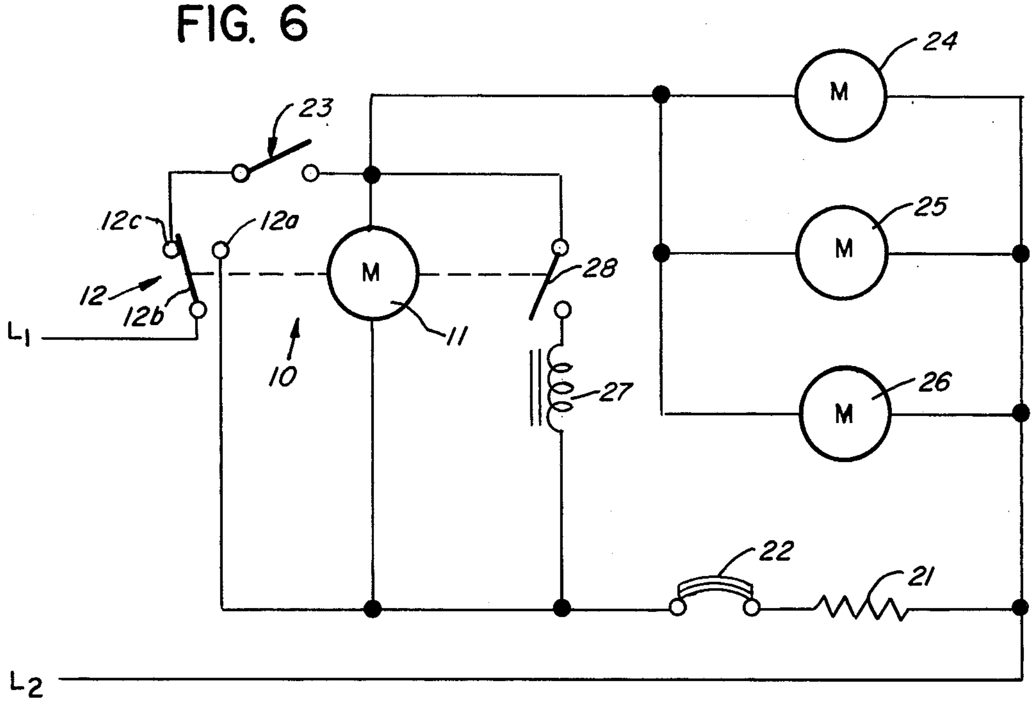
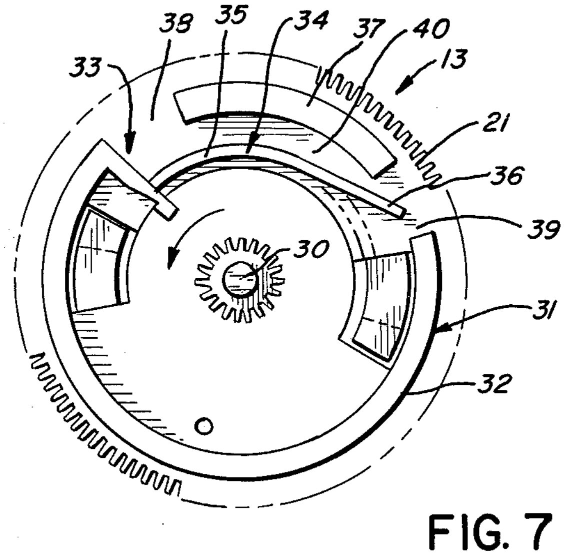
FIG. 7

SNAP-ACTION CAM FOR TIMER SWITCH

BACKGROUND OF THE INVENTION

1. Field of the Invention

This invention relates to electrical controls and in particular to cam operated switch means.

2. Description of the Prior Art

In U.S. Pat. No. 3,648,478, of applicant, which patent is owned by the assignee hereof, a defrost control for a refrigeration apparatus is shown to include a double throw switch controlling the operation of a timer motor alternatively connected in parallel with and in series with the compressor motor of the apparatus. In each of the thrown positions of the double throw switch, the timer motor is energized so as to continue the timing operation. However, should the switch stop in a dead break position where the moving contact is not in engagement with either of the fixed contacts of the double throw arrangement, the timer motor will be de-energized and further operation of the control prevented. As the throwing of the switch is effected by cam means driven by the timer motor, gradual camming of the switch from one condition to the other may, at times, result in opening of one closed circuit without closing the other, thereby causing such discontinuation of the operation of the control. The present invention is directed to remedying such a problem.

Another adjustable switch for timers is shown in U.S. Pat. No. 2,578,824 of David Morrison. The Morrison switch means provides a snap action in both directions of operation of the switch by utilizing two movable members for controlling the cam follower. The spring bias of the switch is utilized to obtain a rapid opening thereof and a separate spring biasing the movable members is utilized to obtain a rapid closing thereof.

David Morrison, in a subsequent U.S. Pat. No. 2,617,900, shows a defrosting timer utilizing a pair of cams with a corresponding pair of movable switch members.

In U.S. Pat. No. 3,575,561 of Robert L. Wooding, a switch control is shown having a pair of cams for operating a snap-action switch. The device further includes a pair of movable levers one of which is interconnected to the switch blade, both levers being continuously urged toward operative engagement with the cam means. The levers are selectively moved by the cam means to provide the desired control.

In U.S. Pat. No. 3,648,476 of applicant, which patent is owned by the assignee hereof, a control utilizing a bimetal switch for controlling the drive motor of the ice maker is shown.

John L. Harris, in U.S. Pat. No. 3,699,281, shows a switch control wherein a latch prevents closure of the contacts until a timer knob has been turned far enough to ensure complete closure of the contacts. The latch allows the contacts to assume very close proximity before releasing to avoid contact bounce. The control utilizes a pair of followers and a pair of cams so as to provide the desired rapid closing of the single throw switch.

In U.S. Pat. No. 3,710,043 of Wallace L. Linn, et al., a switch is provided with electrical contacts carried by cooperating switch blades intermittently engaged with one another in response to intermittent release of energy generated by rotating resilient means. A finger operating the switch is deflected by a ramp on the cam so as to flip the switch contacts when the finger rides past the ramp. The switch comprises a single throw switch with the control causing accurate rapid closing thereof under the timed control of the driven spring finger.

SUMMARY OF THE INVENTION

The present invention comprehends an improved cam controlled switch means wherein a single driven cam includes a first portion selectively engaged by the cam follower to oppose an urging of the cam follower by the switch actuator spring means and dispose the actuator in a disposition causing the switch to be in one of the closed operating conditions, a second portion of the cam being arranged to permit the cam follower to be moved rapidly in a first direction by the spring biased switch actuator sufficiently to permit the switch to be disposed in a first disposition during a preselected timed portion of the driven cam movement. Second spring means are carried by the cam to urge the cam follower in a direction opposite to the first direction to overcome the switch spring means to return the switch actuator to the second disposition and correspondingly throw the switch substantially instantaneously to the second operational condition.

The spring means may be formed integrally with the cam.

Thus, the invention broadly comprehends the provision of improved, simplified means for effecting positive throwing of a double throw switch to each of its operational conditions where the switch is spring biased to one of the operational conditions. The control is effected by means of a single cam and cam follower.

The control may be utilized in conjunction with the controlling of a timer motor which may serve as the means for driving the switch cam. The gradual movement of the cam may be utilized to effect a rapid throwing of the switch to either of the operational conditions thereof by the spring means normally associated with the switch and the spring means associated with the cam.

In the illustrated embodiment, the control is utilized in connection with a refrigeration apparatus wherein one of the operational conditions of the switch effects energization of a defrost heater and the other of the operational conditions of the switch effects operation of the refrigeration apparatus, with the timer motor being energized in both operational conditions of the switch to provide desirable timing during each of the defrost and refrigeration cycles of the apparatus.

Thus, the control of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawings wherein:

FIG. 6 is a schematic wiring diagram of the control; and

FIG. 7 is an elevation of the cam means of the control.

DESCRIPTION OF THE PREFERRED EMBODIMENT

Figure 2:
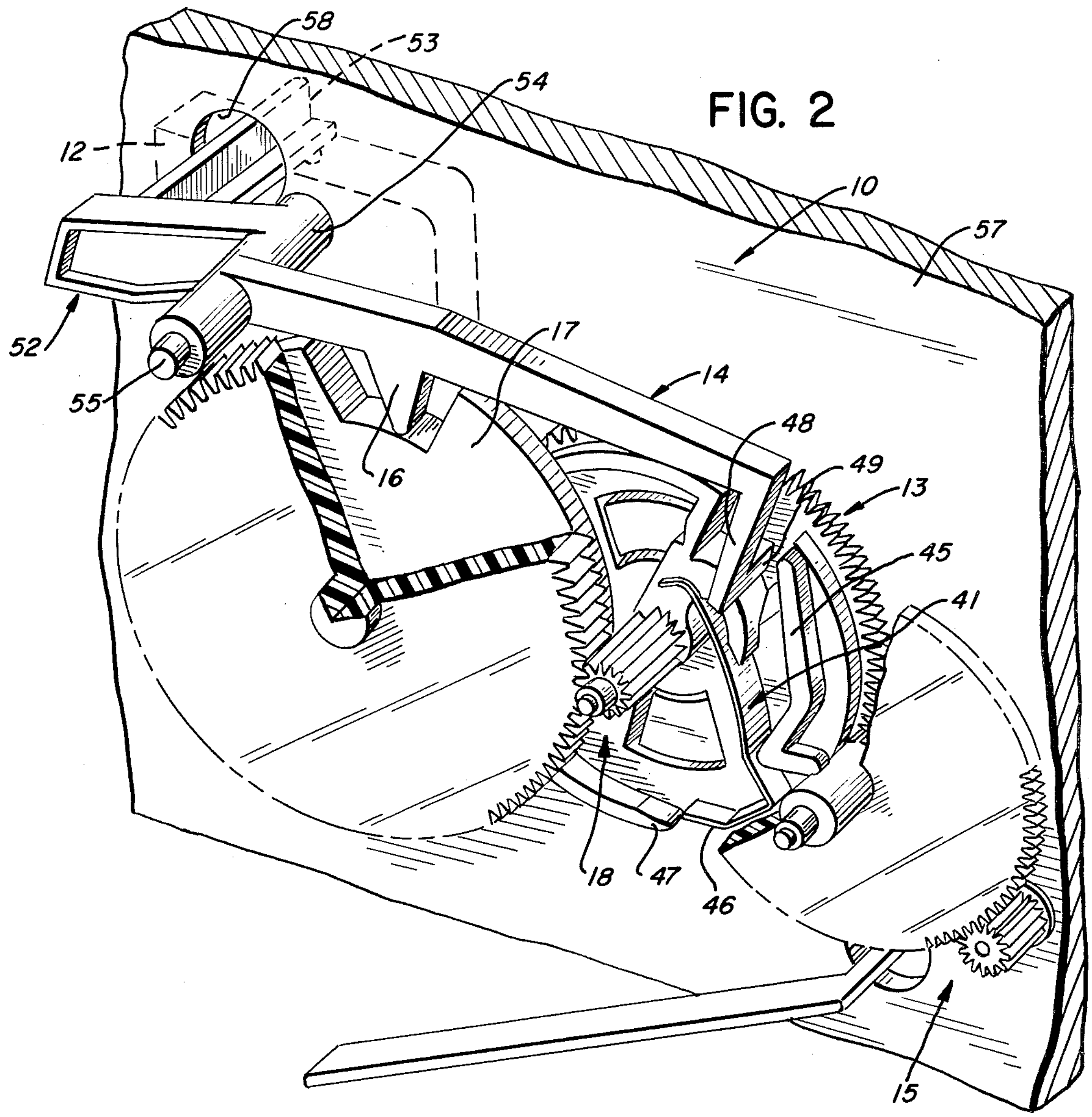
FIG. 2 is a fragmentary enlarged perspective of the control.
Figure 1:
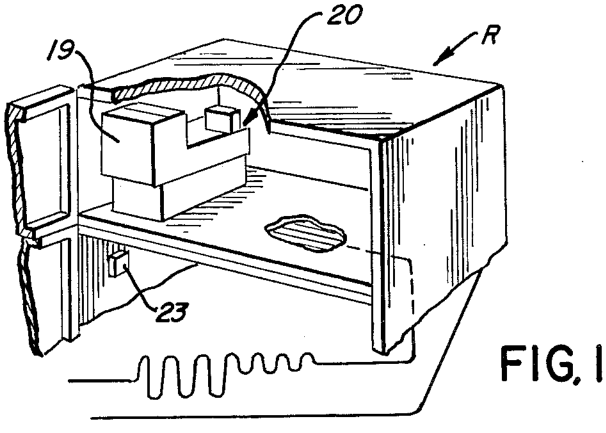
FIG. 1 is a fragmentary perspective view of a refrigeration apparatus having a control embodying the invention.

In the exemplary embodiment of the invention as disclosed in the drawing, an improved switch control generally designated 10 is provided for controlling the operation of the timer motor 11. The control includes a single pole double throw switch 12, a cam 13, and a cam follower 14. Cam 13 is driven from motor 11 by means of suitable gears 15.

Cam follower 14 may include a first control portion 16 controlled by a second cam 17 driven by suitable gearing 18 to provide a supplemental timing control permitting control of movement of the cam follower 14 by cam 13 only at pre-selected intervals corresponding to multiples of rotation of the cam 13 by gears 15.

Switch control 10 may be mounted in a housing 19 associated with an ice maker 20 of a refrigeration apparatus R, which may comprise a refrigerator-freezer apparatus. In such apparatus, it is desirable at times to provide a defrosting operation, and as shown in FIG. 6, the apparatus may include a defrost heater 21 connected in series with a bimetal switch 22 to a first fixed contact **12*a* of switch 12. The other fixed contact 12*c* of switch 12 may be connected through a suitable thermostat switch 23 to a parallel connection of the compressor motor 24, evaporator fan motor 25 and condenser fan motor 26 of the refrigeration apparatus. Timer motor 11 is connected between switch 23 and bimetal switch 22 and a series circuit of a water valve solenoid 27 and controlling water valve switch 28 to be connected in parallel with the motor 11. Moving contact 12*b* of switch 12 is connected to power supply lead L1 and the parallel connection of compressor motor 24, evaporator fan motor 25 and condenser fan motor 26, and defrost heater 21 is connected to the other power supply lead L2 to complete the circuit as shown in FIG. 6**.

As further shown in FIG. 6, the throwing of moving contact **12*b* of switch 12 selectively into engagement with either of fixed contacts 12*a* and 12*c* effects energization of motor 11 in either operational condition of the switch. Thus, when the moving contact 12*b* is closed with contact 12*c*, as shown in FIG. 6, and thermostat switch 23 is closed, refrigerating operation of the apparatus is effected concurrently with the operation of timer motor 11. Thus, timer motor 11 is energized through the relatively low resistance of heater 21 while motors 24, 25 and 26** are effectively directly connected across the power supply leads.

When moving contact **12*b* of switch 12 is thrown into closed engagement with fixed contact 12*a* to energize defrost heater 21, the timer motor 11 is again energized by a series connection with the parallel connection of the three motors 24, 25 and 26 now presenting relatively low effective impedance in the series circuit. It may be seen, with reference to FIG. 6, that continued operation of the timer motor to effect timing control of the apparatus requires that the moving contact 12*b* be fully thrown into electrical contact with either of the fixed contacts 12*a* and 12*c*. The present invention is concerned with improved means for assuring that the moving contact is so fully thrown to provide each of the desired operational conditions of switch 12** wherein positive closed connections are selectively provided through the switch to provide the corresponding defrost operation or refrigeration operation of the apparatus.

As best seen in FIG. 7, cam 13 may include a gear portion 29 forming a portion of the gear train 15 for rotating the cam on an axial shaft 30. The cam includes a first camming portion 31 defining an arcuate outer surface 32 adapted to be selectively engaged by a distal finger 49 of cam follower 14 during the period of rotation of the cam wherein surface 32 underlies the finger 49. The cam further defines a second camming portion generally designated 33, comprising a recessed, generally arcuate portion between opposite ends of the first camming portion 31. In the embodiment of FIG. 7, the second camming portion is further defined by a spring 34 having an inner leading arcuate portion 35 and a distal outwardly extending portion 36.

Outwardly of the spring 34 and spaced from each of the opposite ends of the first camming portion 31 is an arcuate lip portion 37 of the cam. The opposite ends of lip portion 37 define an entrance passage 38 and an exit passage 39. The lip portion 37 defines, with the spring portion 34, an arcuate guide passage 40.

Figure 3:
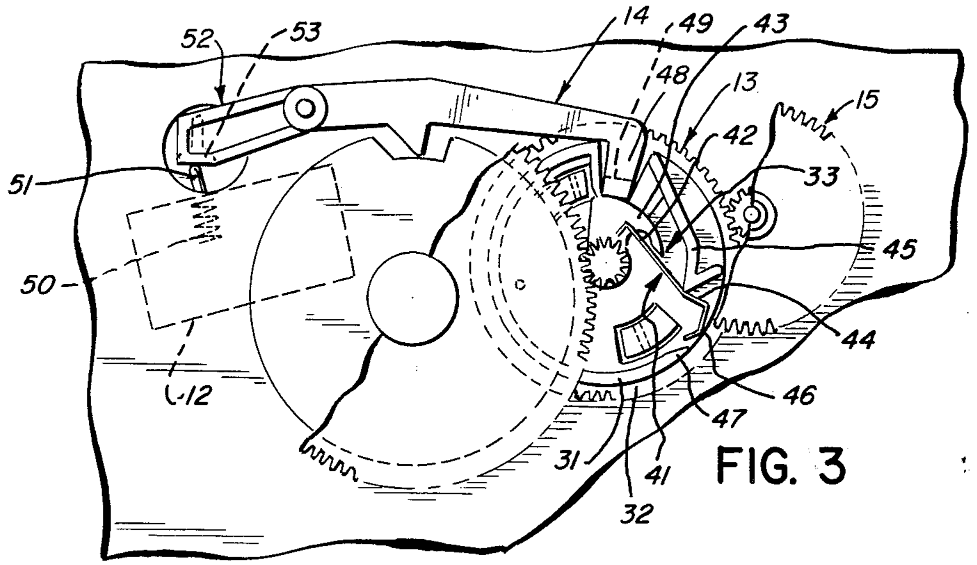
FIG. 3 is a fragmentary elevation illustrating the arrangement of the control with the switch in a first operational condition.

In the embodiment of FIGS. 2–5, the spring portion 34 may comprise a separate metallic spring 41 having its inner end 42 embedded in the cam radially inwardly of a second inner guiding lip 43 of the cam. In its unbiased condition, as shown in FIG. 3, an outer portion 44 of the spring is biased against the clockwise end of the outer guide lip 45 of the cam. A turned distal end 46 of the spring 41 extends to adjacent the counterclockwise end 47 of first camming portion 31 of the cam.

Figure 4:
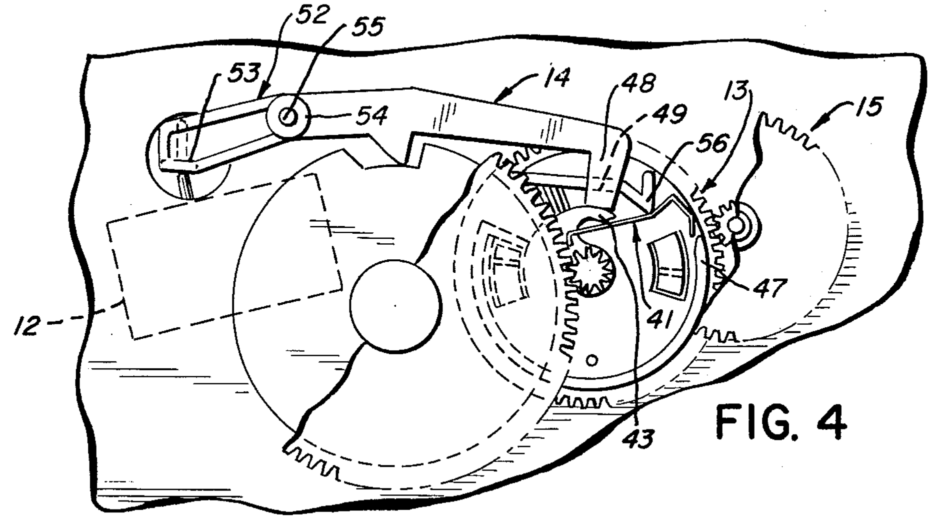
FIG. 4 is a fragmentary elevation illustrating the arrangement of the control with the switch maintained in the first operating condition as during a timed portion of the operation of the control.
Figure 5:
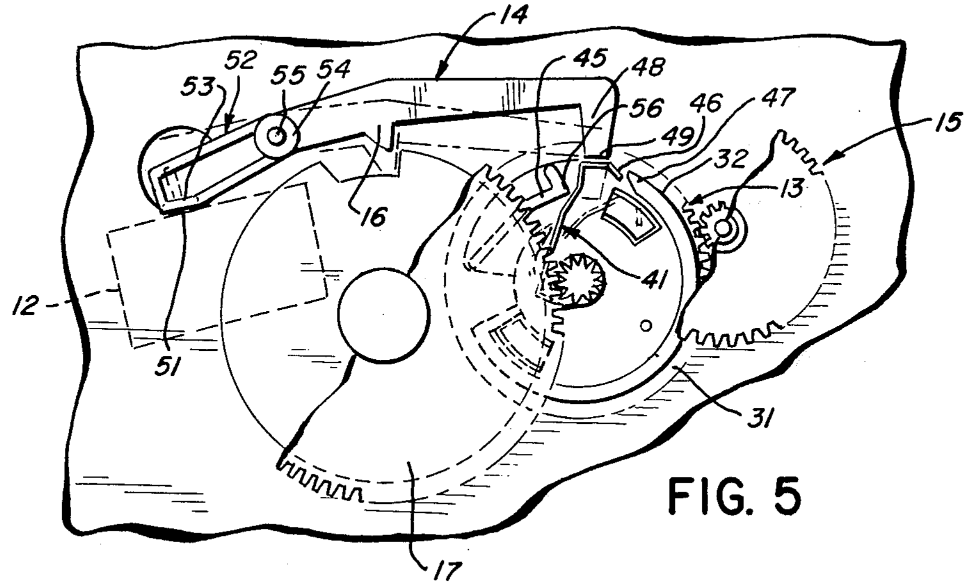
FIG. 5 is a fragmentary elevation illustrating the control as arranged to effect a throwing of the switch to a second operational condition.

As best seen in FIG. 2, the distal end 48 of cam follower 14 includes a finger portion 49 adapted to ride on the first camming surface 32 and to be received in the recessed second camming portion 33. As illustrated in FIGS. 3, 4 and 5, as the cam rotates in a counterclockwise direction, the finger 49 is effectively caused to move along the guiding lip 43 onto the spring 41 so as to be urged by the spring radially outwardly against the radially inner surface of the guiding lip 45.

When the finger moves past the clockwise end corner 56 of the guiding lip 45, the spring substantially instantaneously throws the finger radially outwardly to align the finger circumferentially with the outer surface 32 of the camming portion 31. Thus, further counterclockwise rotation of the cam causes a transfer of the finger 49 onto the first camming portion 31 to maintain the cam follower in the disposition of FIG. 5.

Control switch 12 comprises, as discussed above, a single pole, double throw switch which may be of conventional, self-contained construction and which is biased by suitable spring means 50 associated therewith to be normally disposed in a first operational condition wherein the moving contact **12*b* is closed with fixed contact 12*a*. In such condition, a switch actuator portion 51 of the switch 12 is extended outwardly, as illustrated in FIG. 3, also by the action of spring 50**.

As further shown in FIGS. 2 and 3, the cam follower includes a second end portion 52 having an actuator engaging portion 53. The cam follower is pivotally mounted about a mid-portion 54 thereof on a suitable pivot 55 so that when the follower 52 is urged in a clockwise direction by the spring means 50, as shown in FIG. 3, the finger portion 49 thereof is urged radially inwardly into the recessed camming portion 33 or against the outer surface 32 of the second cam portion 31, depending on the rotational position of the cam.

As the spring means 50 effectively positively biases the switch so as to close moving contact **12*b* to 12*a* when outward movement of the actuator 51 is permitted, under such conditions, the switch is positively thrown said first operational condition thereof wherein a defrost operation of control 10 is effected, as discussed above, by connection of the heater 21 across the power supply leads L1 and L2 through closed contacts 12*b* and 12*a***.

However, when the finger 49 of the cam follower is disposed outwardly of the recessed cam portion, such as in FIG. 5, or when the finger is riding on the surface 32 of cam portion 31, the cam follower is pivoted in a counterclockwise direction, as seen in FIG. 5, to urge the actuator 51 inwardly against the action of spring 50, thereby throwing moving contact **12*b* into closed circuit connection association with fixed contact 12*c* defining a second operational condition of the switch. As the spring 41 (34) must act against spring 50 in throwing the cam follower 14 in the counterclockwise direction, the strength of spring 41 (34) is made substantially greater than that of spring 50. Hence, the throwing of moving contact 12*b*** is effectively positive and substantially instantaneous, thereby effectively avoiding a dead break condition in the switching operation.

In the illustrated embodiment, cam 13 may be formed of molded synthetic resin, such as acetyl copolymer resin, and as discussed above, the cam spring means may be formed integrally therewith or as a separate metal spring element attached thereto as desired. Cam follower 14 may similarly be formed of molded synthetic resin and, thus, the control may be extremely simple and economical of construction. As shown in FIG. 2, the control may be carried on a wall member 57 which may form a portion of the housing 19 of ice maker 20. Thus, the operator portion 53 may be extended through a suitable opening 58 in the wall 57 permitting the switch 12 to be mounted on the opposite side of the wall from the cam and cam follower means, as shown in FIG. 2.

Thus, the present invention provides an improved control for controlling a double throw switch having means for biasing the switch to provide a first closed connection, wherein a single cam and cam follower effect rapid, positive throwing of the switch in either direction. The control is advantageously adapted to control the drive motor of the cam where the double throw switch controlled thereby in turn controls the energization of the drive motor.

In addition to elimination of the dead break condition, the present invention provides more accurate timing because variation in the trip point of the switches used is inconsequential, due to the rapid throwing action which the switch control imparts to the cam follower.

The foregoing disclosure of specific embodiments is illustrative of the broad inventive concepts comprehended by the invention.

Having described the invention, the embodiments of the invention in which an exclusive property or privilege is claimed are defined as follows:

1. In a control having an electrical switch, a first spring means for biasing the switch to a first operational condition, a switch actuator biased by the spring means to a first disposition when the switch is biased to said first operational condition, a cam follower, and means responsive to selective urging of the spring biased switch actuator to said first disposition to urge said cam follower in a first direction, the improvement comprising:

drive means;

a single cam driven by said drive means and having a first portion selectively engaged by said urged cam follower to oppose said urging of the cam follower by the switch actuator spring means and dispose said switch actuator in a second disposition causing the switch to be in a second operational condition, and a second portion with which the cam follower becomes associated as a result of the driving of said cam by said drive means, said second portion being arranged to permit the cam follower to be moved in said first direction by said spring biased switch actuator sufficiently to permit said switch to be disposed in said first operational condition during a preselected timed portion of the driven cam movement; and second spring means carried by the cam and arranged to urge said cam follower in a second direction opposed to said first direction to overcome said first spring means to return said switch actuator to said second disposition and correspondingly throw said switch substantially instantaneously to said second operational condition.

2. The control structure of claim 1 wherein said second spring means is formed integrally with said cam.

3. The control structure of claim 1 wherein said second spring means is arranged to bias said cam follower in said second direction during at least a portion of the time when said cam follower is on said second cam portion, and said cam includes means preventing movement of said cam follower to return said switch actuator until the end of said timed portion of cam movement.

4. The control structure of claim 1 wherein said second spring means is arranged to bias said cam follower in said second direction during said timed portion of the driven cam movement and said cam includes means preventing movement of said cam follower to return said switch actuator until the end of said timed portion comprising a shoulder movably engaged by a portion of the cam follower.

5. The control structure of claim 1 wherein said drive means includes a timer motor electrically connected to said switch.

6. In a cam operated switch mechanism including a double throw switch, an actuator for moving said switch between first and second switched positions, and spring means for biasing said switch and said actuator to said first switched position, an improved switch operating means comprising:

a timer drive means; and a cam and camming means including a cam follower, said cam follower having a first portion operatively engaging said actuator and a second portion engaging said cam, said cam having first and second cam surfaces sequentially engaging said second portion as an incident of the driving of said cam by said timer drive means for positioning said follower in first and second positions to thereby correspondingly cause positioning of said switch selectively to said first and second switched positions, said camming means further including moving means for rapidly moving said follower from said first position to said second position.

7. The switch mechanism of claim 6 wherein said moving means comprises a spring carried by said cam and operative to snap said follower from said first position to said second position.

8. The switch mechanism of claim 6 wherein said first cam surface comprises the peripheral edge surface of said cam and said second surface comprises a surface disposed inwardly of said edge surface.

9. The switch mechanism of claim 6 wherein said cam includes a lip portion retaining said cam follower against the action of said moving means until said cam follower moves fully along said second cam surface.

10. The switch mechanism of claim 6 wherein said spring means biases said cam follower toward engagement with said cam.

11. The switch mechanism of claim 6 wherein said double throw switch comprises a snap action switch.

12. In a control having a double throw switch providing alternatively first and second closed connections, means biasing said switch to provide said first closed connection, drive means including a timer motor, a cam driven by said drive means and having first and second portions, and a cam follower cooperating with said first cam portion to permit said biasing means to throw said switch to provide said first closed connection, the improvement comprising spring means carried by the cam to cause said cam follower to move substantially instantaneously from said first cam portion to throw said switch against the action of said biasing means to open said first closed connection and provide said second closed connection, said timer motor being electrically energized through said second closed connection.

13. The control structure of claim 12 wherein said timer motor is electrically energized through said first closed connection.

14. The control structure of claim 12 wherein said spring means is formed integrally with said cam.

15. The control structure of claim 12 wherein said spring means moves said cam follower to a position wherein further driving of the cam by said drive means causes said cam follower to engage said second cam portion and be controlled thereby to maintain said switch providing said second closed connection.

16. The control structure of claim 12 wherein said spring means includes a guide portion retaining said moved cam follower in a position wherein further driving of the cam by said drive motor causes said cam follower to engage said second cam portion and be controlled thereby to maintain said switch providing said second closed connection.

17. The control structure of claim 12 wherein said cam includes means for retaining said cam follower positioned to permit said biasing means to position said switch in said first closed condition notwithstanding the urging of said cam follower by said cam carried spring means.

* * * * *